(12) United States Patent
Petersen et al.

(10) Patent No.: US 11,990,050 B2
(45) Date of Patent: May 21, 2024

(54) DYNAMIC VERTIPORT CONFIGURATION

(71) Applicant: Joby Aero, Inc., Santa Cruz, CA (US)

(72) Inventors: Jon David Petersen, Walnut Creek, CA (US); Rex J. Alexander, Fort Wayne, IN (US); Stanley Stephen Swaintek, III, Mill Valley, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 0 days.

(21) Appl. No.: 18/321,289

(22) Filed: May 22, 2023

(65) Prior Publication Data

US 2023/0386348 A1 Nov. 30, 2023

Related U.S. Application Data

(63) Continuation of application No. 17/501,710, filed on Oct. 14, 2021, now Pat. No. 11,694,561, which is a continuation of application No. 16/248,170, filed on Jan. 15, 2019, now Pat. No. 11,176,834.

(51) Int. Cl.
| | |
|---|---|
| *G08G 5/00* | (2006.01) |
| *B64C 29/00* | (2006.01) |
| *G06N 20/00* | (2019.01) |
| *G08G 5/02* | (2006.01) |

(52) U.S. Cl.
CPC ........... *G08G 5/0043* (2013.01); *B64C 29/00* (2013.01); *G06N 20/00* (2019.01); *G08G 5/02* (2013.01)

(58) Field of Classification Search
CPC ........ G08G 5/0043; G08G 5/02; G06N 20/00; B64C 29/00
See application file for complete search history.

(56) References Cited

U.S. PATENT DOCUMENTS

| | | | |
|---|---|---|---|
| 2017/0197710 A1* | 7/2017 | Ma | ........................ G08G 5/0013 |
| 2018/0101173 A1* | 4/2018 | Banerjee | ................... G06T 7/70 |
| 2019/0221127 A1 | 7/2019 | Shannon | |
| 2019/0248511 A1 | 8/2019 | Lewis et al. | |
| 2020/0073412 A1 | 3/2020 | McNair et al. | |
| 2020/0089220 A1 | 3/2020 | Schmalzried et al. | |
| 2020/0219010 A1 | 7/2020 | Jobling et al. | |

* cited by examiner

*Primary Examiner* — Jaime Figueroa
*Assistant Examiner* — Jamal A Shah
(74) *Attorney, Agent, or Firm* — Dority & Manning, P.A.

(57) ABSTRACT

A vertiport system dynamically updates configuration of a vertiport based on predicted usage of the vertiport during a given time frame. The vertiport system predicts vertiport usage using flight data and estimated passenger demands and determines a desired number of parking pads and a desired number of final approach and takeoff (FATO) pads for the vertiport during the time frame. Based on the desired number of parking pads and the desired number of FATO pads for the vertiport, the vertiport system determines an updated configuration of the vertiport. According to the updated configuration, the vertiport system updates the configuration of the vertiport for at least a portion of the time frame.

20 Claims, 11 Drawing Sheets

DYNAMIC VERTIPORT CONFIGURATION

PRIORITY CLAIM

The present application is a continuation of U.S. application Ser. No. 17/501,710 having a filing date of Oct. 14, 2021 and issued as U.S. Pat. No. 11,694,561, which is a continuation of Ser. No. 16/248,170 having a filing date of Jan. 15, 2019 and issued as Pat. No. 11,176,834. Applicant claims priority to and the benefit of each of such applications and incorporates all such applications herein by reference in their entirety.

BACKGROUND

This disclosure relates generally to vertiport configuration and more specifically to dynamic configuration of a vertiport based on predicted vertiport usage during a particular time period.

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical takeoff and landing (VTOL) aircraft provide opportunities to incorporate aerial transportation into transport networks for cities and metropolitan areas.

SUMMARY

A vertiport system dynamically updates configuration of a vertiport based on current and/or predicted future usage of the vertiport during a given time frame. The vertiport system predicts vertiport usage for a time frame using vehicle routing data and user demand data. Based on the predicted vertiport usage, the vertiport system determines a desired number of parking pads and a desired number of final approach and takeoff (FATO) pads for the vertiport during the time frame. The vertiport system determines an updated configuration of the vertiport based on the desired number of parking pads and the desired number of FATO pads based on the desired number of parking pads and the desired number of FATO pads. According to the updated configuration, the vertiport system updates the configuration of the vertiport for at least a portion of the time frame.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A vertiport is a location with one or more final approach and take off (FATO) pads from which vehicles takeoff and land and/or parking pads at which vehicles charge batteries, load and unload passengers and cargo, and park until the next flight. The vertiport may also be used for operations such as picking up and dropping off passengers and conducting vehicle maintenance. Because usage of the vertiport varies throughout the day, the vertiport configuration can be dynamically updated based on a predicted usage of a vertiport determined using a variety of input information. The vertiport configuration may be based on current information such as the current vertiport configuration and current vehicle status and also based on future information associated with some uncertainty such as future demand, future flight schedules, and/or predicted energy requirements of the vehicles.

A transport network may include vehicles that transport passengers and/or cargo between vertiports. Vehicles may undergo various operations at a vertiport, such as passenger drop off and pick up, battery charging, and vehicle inspection. Vehicles may also remain parked at the vertiport until the next scheduled flight. The vertiport may include designated areas for landing and takeoff as well as parking areas for vehicle servicing, battery charging, and/or storage. However, the usage of the vertiport varies throughout the day, and it is difficult to design a single configuration for the vertiport that satisfies the requirements for the various use cases. For example, during peak periods, there may a large number of vehicles that are in service, and there is an increased need for final approach and takeoff (FATO) pads used as landing and takeoff areas to support the high throughput of vehicles. In contrast, during off-peak periods, there is a decreased need for FATO pads because there are fewer vehicles scheduled for flights, and there is an increased need for parking pads on which vehicles may park and charge until the vehicles are in use. This and other problems may be addressed by a vertiport that can be dynamically configured to meet predicted usage demand.

In one embodiment, the vertiport includes lights mounted on, in, or under a surface of the vertiport such that the lights are visible from above the surface. The configuration of the vertiport is indicated by an illumination pattern generated by the lights. The predicted usage of the vertiport is determined based at least on vehicles that are scheduled to land and takeoff from the vertiport during a given time frame. The vertiport system determines an updated configuration of the vertiport for that time frame which describes the number of FATO pads, the number of parking pads, the location of the FATO pads, the location of the parking pads on the vertiport, and taxiways connecting FATO pads and parking pads. No later than the beginning of the time frame, the pattern generated by the lights is updated to display the updated configuration. Once the vertiport configuration is updated, the vertiport system directs vehicles to the designated location on the vertiport. For example, an inbound vehicle is directed to land on a FATO pad on the vertiport, and an outbound vehicle is instructed to use a taxiway to move from a parking pad to a FATO pad after charging is complete.

Figure 1:
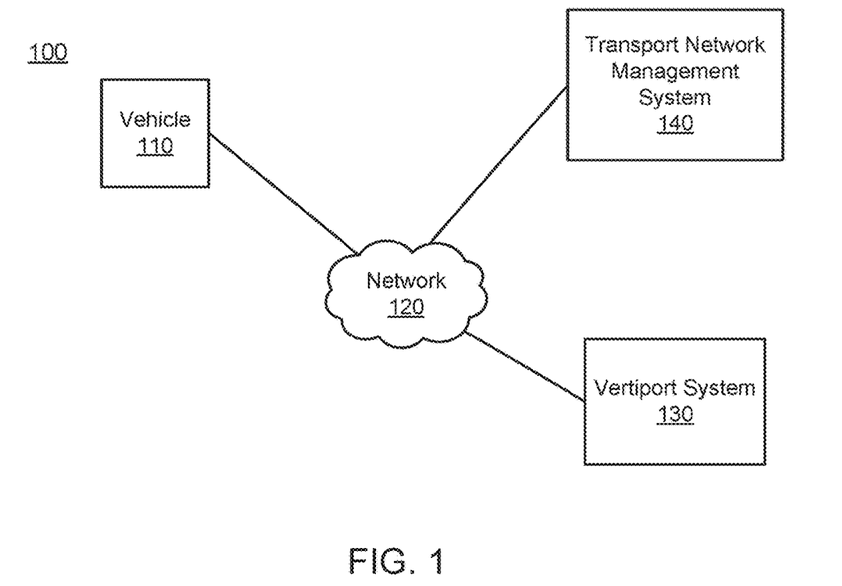
FIG. 1 is a block diagram of a system environment in which a transport network management system operates, in accordance with an embodiment.

FIG. 1 is a block diagram of a system environment 100 in which a transport network management system operates, in accordance with an embodiment. In the embodiment shown in FIG. 1, the system environment 100 includes a vehicle 110, a network 120, a vertiport system 130, and a transport network management system 140. Although only one vehicle 110 is shown in FIG. 1, there may be additional (e.g., hundreds or thousands of) vehicles 110 in the system environment 100. In other embodiments, the system environment 100 contains different and/or additional elements.

A vehicle 110 is connected to the transport network management system 140 and the vertiport system 130 via the network 120. The vehicle 110 may include a computer system that communicates status information via the network 120. The status information may include current location, scheduled flight route, current battery charge, potential component failures, passengers onboard, and the like. The vehicle 110 may be a VTOL aircraft that transports passengers from one vertiport to another vertiport based on routing information received from the transport network management system 140 via the network 120. After being routed to a vertiport by the transport network management system 140, the vehicle 110 may receive instructions from a vertiport system 130 to land in a particular area of the vertiport (e.g., a particular FATO pad at the vertiport). In one embodiment, the vehicle 110 is an electric vehicle (e.g., electric VTOL) that includes a battery that needs to be charged. The battery may be charged at a charging station at the vertiport to at least a threshold battery level in between consecutive flights. In some embodiments, the vehicle 110 may receive instructions from the vertiport system 130 to move to a charging station via a taxiway that connects the FATO pad to a charging station after landing on the FATO pad. In other embodiments, the vehicle 110 may remain in the same location after landing on a FATO pad, and the configuration of the vertiport may be updated such that the location is used for a charging pad instead of the vehicle 110 having to taxi to a different location for charging.

The network 120 provides the communication channels via which the other elements of the system environment 100 communicate. The network 120 can include any combination of local area and/or wide area networks, using both wired and/or wireless communication systems. In one embodiment, the network 120 uses standard communications technologies and/or protocols. For example, the network 120 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The vertiport system 130 manages a plurality of vertiports and determines a configuration for each of the vertiports based on a predicted usage of the vertiport during a time frame. A vertiport is an airport configured for vertical takeoff and landing (VTOL) vehicles (herein referred to as vehicles for simplicity). The VTOL vehicles may be electric vehicles, hybrid vehicles, or vehicles using traditional propulsion systems. Because the vehicles takeoff in a vertical direction, vertiports do not require as much space as airplanes that need a runway of a significant length available to takeoff and land. Further, the vehicles may be smaller in size than airplanes. As such, vertiports are more space efficient than airports, and may be built on unused space (e.g., on top of buildings in metropolitan areas). The plurality of vertiports may have varying sizes, features, maximum capacity for vehicles, and the like based on the availability of surface area, energy resources, and demand for vertiport. These characteristics of the plurality of vertiports may be stored by the vertiport system 130.

The vertiport system 130 predicts usage of each of the plurality of vertiports based on information provided by the transport network management system 140 and the vehicles 110 in the network 120. Based on the predicted usage of the vertiport, the vertiport system 130 determines an optimal configuration of the vertiport for a given time frame. In a vertiport, there is a set amount of space available. The vertiport system 130 determines an optimal tradeoff between throughput of vehicles during a time frame (e.g., number of FATO pads available for landing and takeoff) and capacity for parking (e.g., number of parking pads) based on the predicted usage of the vertiport. The vertiport system 130 determines the number of FATO pads and the number of parking pads to be available on the vertiport during the time frame and determines the optimal configuration of the vertiport system 130. After determining the optimal configuration, the vertiport system dynamically updates the configuration of the vertiport by illuminating a pattern representing the configuration on the surface of the vertiport. Based on the updated vertiport configuration, the vertiport system 130 may provide instructions to grounded vehicles on the vertiport to move to a different location on the vertiport and direct inbound vehicles scheduled to land within the time frame to specific FATO pads on the vertiport.

The transport network management system 140 manages information from vehicles 110 and vertiport system 130. Although not shown in FIG. 1, the transport network management system 140 may also be connected to user devices of passengers. The transport network management system 140 may receive requests for rides from passengers via the user devices and use the requests to generate vehicle routing information and flight schedules for vehicles 110 and match passengers to vehicles 110. The transport network management system 140 also receives status of vertiports that includes current configuration of the vertiport, inbound vehicles, outbound vehicles, and grounded vehicles for each vertiport. Details on the transport network management system 140 are discussed below with respect to FIG. 2.

Figure 2:
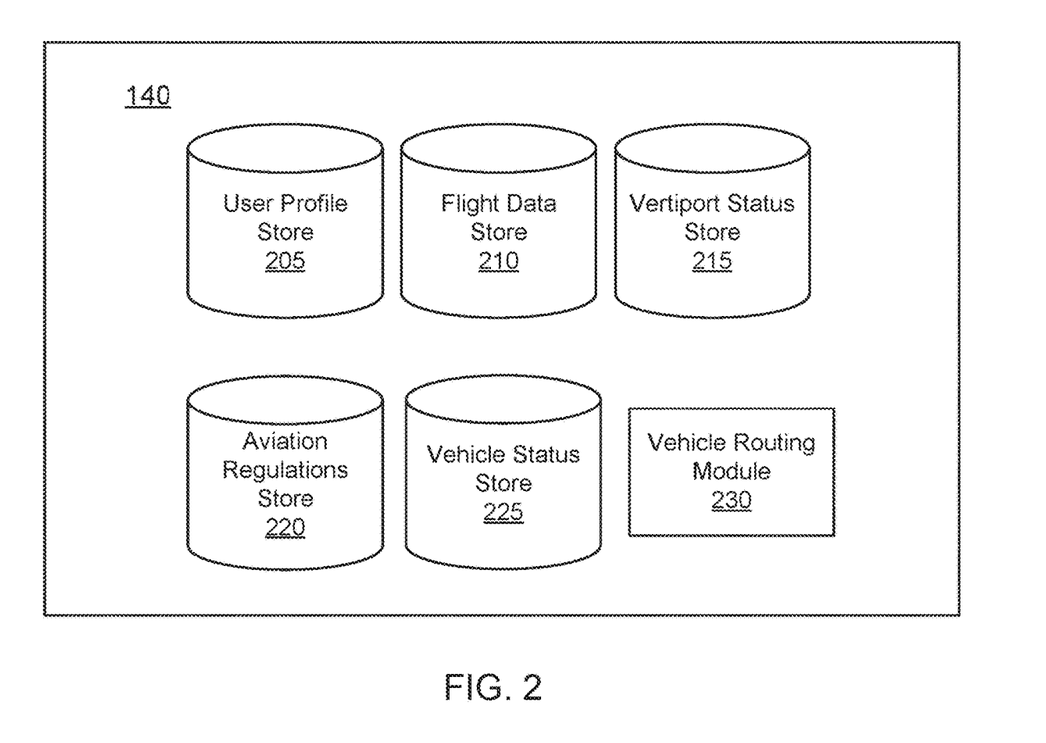
FIG. 2 is a block diagram of a transport network management system, in accordance with an embodiment.

FIG. 2 is a block diagram of a transport network management system 140, in accordance with an embodiment. In the embodiment shown in FIG. 2, the transport network management system 140 includes a user profile store 205, a flight data store 210, a vertiport status store 215, an aviation regulations store 220, a vehicle status store 225, and a vehicle routing module 230. In other embodiments, the transport network management system 140 contains different and/or additional elements. In addition, the functions may be distributed among the elements in a different manner than described.

Each user of the transport network management system 140 is associated with a user profile, which is stored in the user profile store 205. A user profile includes information about the user that was shared by the user such as name, age, contact information, home address, work address, and payment methods. In some embodiments, a user profile may include a profile picture provided by the user for identification. A user profile in the user profile store 205 may also store information generated by the transport network management system 140 based on a user's activity on the transport network management system 140. For example, the transport network management system 140 may store the user's past travel history, frequent destinations, saved home address, saved work address, other users connected to the user. When a user makes a request for transport service, the user profile may be updated to include the user's current location, pickup vertiport, and/or destination vertiport.

The flight data store 210 stores flight information of vehicles 110 connected to the transport network management system 140. For each vehicle 110, the transport network management system 140 may store information about past flights and scheduled flights. The flight data store 210 may store expected/actual flight information such as departure time, departure location, number of passengers, time of arrival, arrival location, route information, and the like. The flight information of vehicles 110 may be updated at a predetermined frequency while a vehicle is en route. The flight data store 210 may receive updates on the vehicle's information such as real-time coordinates of the vehicle.

The vertiport status store 215 stores the current status of each vertiport included in the vertiport system 130. The current status of the vertiport indicates information such as number of grounded vehicles on the vertiport, the location of the grounded vehicles on the vertiport, energy usage of the vertiport, availability of charging systems, number of FATO pads, number of parking pads, location of FATO pads, location of parking pads, and availability of FATO pads and parking pads for incoming vehicles.

The aviation regulations store 220 includes regulations provided by organizations (e.g., Federal Aviation Administration) that manage aviation safety and noise abatement measures. The aviation regulations store 220 may include safety regulations related to construction and operation of vertiports, air traffic management, and safety of vehicles as well as noise abatement measures to control the noise due to activity in the vertiports in areas around the vertiports. For example, a regulation may require vertiports are constructed to adhere to a set of rules involving landing and takeoff procedures such as ensuring that there is a 135° clearance of obstructions for a threshold distance around each FATO pad. In another example, the regulations may include rules such as maintaining a minimum space between adjacent FATO pads on a vertiport, a maximum number of FATO pads and/or parking pads allowed per square mile, a maximum capacity of vehicles, etc. Although a particular configuration may improve efficiency for a vertiport, if that configuration does not comply with the regulations, an alternative configuration is determined.

The vehicle status store 225 receives current status from vehicles 110 and stores the status information. For each vehicle 110 connected to the transport network management system 140, the vehicle status store 225 maintains real time status of the vehicle related to the battery level/fuel level, inspection required, location of the vehicle, and passenger information.

The vehicle routing module 230 determines a flight route for a vehicle from one vertiport to a different vertiport and provides instructions to the vehicle. Based on requests made by passengers, the vehicle routing module 230 selects vehicles, departure vertiports, and arrival vertiports, and determines routes between the vertiports.

Figure 3:
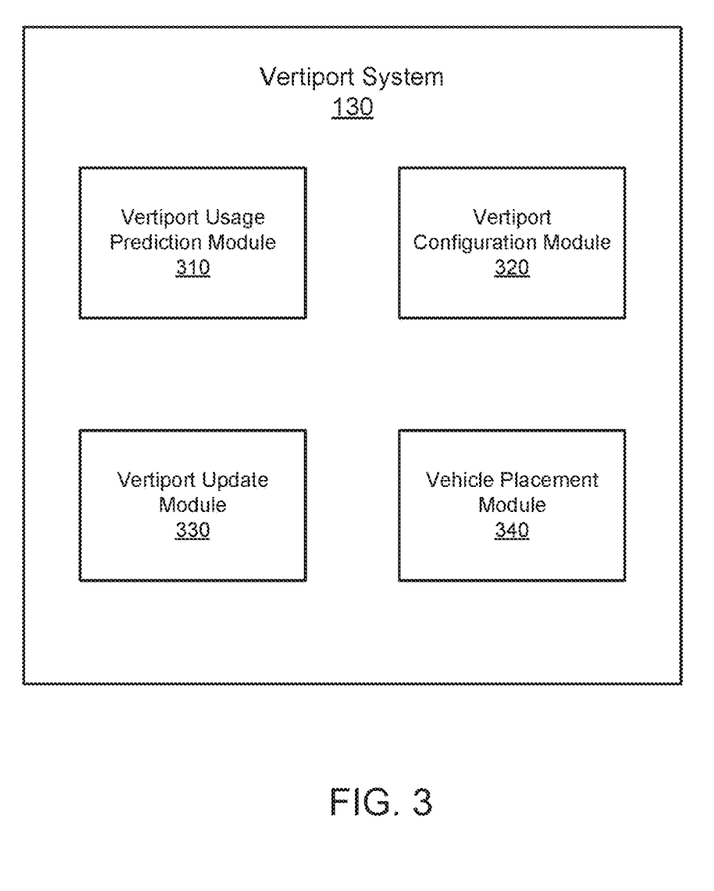
FIG. 3 is a block diagram of a vertiport system, in accordance with an embodiment.

FIG. 3 is a block diagram of a vertiport system 130, in accordance with an embodiment. In the embodiment shown in FIG. 3, the vertiport system 130 includes a vertiport usage prediction module 310, a vertiport configuration module 320, a vertiport update module 330, and a vehicle placement module 340. In other embodiments, the vertiport system 130 may include fewer/additional elements than what is shown in FIG. 3.

The vertiport usage prediction module 310 determines estimated usage of a vertiport based on information provided by vehicles 110 and the transport network management system 140. The vertiport usage prediction module 310 predicts future usage of the vertiport based on a variety of inputs such as flight data and prediction of passenger demand. The vertiport usage prediction module 310 receives flight information for inbound vehicles of the vertiport with estimated time of arrival (ETA). For both the grounded vehicles and the inbound vehicles, the vertiport usage prediction module 310 receives flight schedules and predicts services required by the vehicles. The vertiport usage prediction module 310 may determine the number of vehicles expected to be on the vertiport during a given time frame and the expected usage of the vertiport by the vehicles during the time frame. In some embodiments, the vertiport usage prediction module 310 may receive additional inputs such as the current configuration describing the number of FATO pads, number of parking pads, taxiways connecting the FATO pads and the parking pads, and number and location of grounded vehicles currently on the vertiport.

In some embodiments, the vertiport usage prediction module 310 calculates the total number of vehicles expected to be at the vertiport during the time frame. In some embodiments, there are different types of vehicles at the vertiport, and the vertiport usage prediction module 310 calculates the total number of each type of vehicle. The total number of vehicles may include grounded vehicles and inbound vehicles. From this, the vertiport usage prediction module 310 may determine an expected number of FATO pads and parking pads needed to accommodate these vehicles during the time frame. In one embodiment, the vertiport usage prediction module 310 determines that there should be at least as many FATO pads as inbound vehicles scheduled to arrive during the time frame to provide space for the inbound vehicles to land at the vertiport. Similarly, the vertiport prediction module 310 may determine that there should be at least as many parking pads as grounded vehicles that will be at the vertiport during the time frame.

The vertiport configuration module 320 determines a configuration of the vertiport based in part on the vertiport usage prediction by the vertiport usage prediction module 310. For example, if the vertiport usage prediction module 310 determines a number of FATO pads and parking pads expected to be used in a future time frame, the vertiport configuration module 320 determines a way to provide those numbers of FATO pads and parking pads at the vertiport. The configuration of the vertiport may be based on a plurality of input parameters. The plurality of input parameters may include one or more of the following: current configuration of a vertiport, schedule of flights, energy costs, aviation regulations, and status of vehicles. The vertiport configuration module 320 may be customized to optimize for certain input parameters. For example, if one vertiport has a strict energy constraint, the vertiport may be optimized for energy conservation, while another vertiport that is located in a busy location is optimized for maximum passenger throughput. As another example, the vertiport configuration module 320 may also configure the vertiport to minimize taxiing of vehicles. For example, if the vertiport system 130 receives vehicle status from an inbound vehicle and determines that the inbound vehicle will need charging, the vertiport configuration module 320 may configure the vertiport such that it includes a FATO pad where the inbound vehicle may land and be charged in the same location without taxiing or where the inbound vehicle is taxied a short distance to a charging pad.

The vertiport configuration module 320 may receive inputs including the current configuration of a vertiport that includes a number of FATO pads, a number of parking pads, connecting taxiways between the FATO pads and the parking pads, and recharging station infrastructure. The vertiport configuration module 320 may also receive vehicle information for each of the grounded vehicles on the vertiport such as a total number of the grounded vehicles, current locations of the grounded vehicles on the vertiport, current state of charge of battery in the grounded vehicles, and scheduled flights of the grounded vehicles.

In one example, the vertiport configuration module 320 receives a current status of a vertiport from the vertiport status store 215 that there is currently a first vehicle, a second vehicle, and a third vehicle on the vertiport and that the three vehicles are expected to be on the vertiport during at least a portion of the time frame. The vertiport configuration module 320 may also receive information about current locations of each of the vehicles on the vertiport which indicates that the first vehicle is on FATO pad and that the second vehicle and the third vehicle are parked on parking pads for battery charging. The vertiport configuration module 320 determines whether the grounded vehicles need to be moved to a different area within the vertiport using flight schedule information (e.g., information stored in flight data store 210) and vehicle status information (e.g., information stored in vehicle status store 225). If one of the vehicles that is charging is scheduled for a flight within the time frame and a charge status of its battery indicates that it is almost fully charged, the vertiport configuration module 320 may determine that the vehicle will require a FATO pad within the next time frame.

The vertiport configuration module 320 may also receive user specified parameters for selecting the configuration. In one embodiment, the user may select the length of time that a configuration of the vertiport is used for before updating to the next configuration. For example, during peak periods when there is high throughput of vehicles, the user may select a short time frame (e.g., one minute) such that the vertiport may be updated frequently and select a long time frame (e.g., one hour) during off-peak periods. The user may also input a daily maximum energy limit. The user may also input a cost associated with changing the vertiport configuration. Changing the vertiport configuration too frequently may be discouraged because there may be operational risk associated with the frequent change.

In some embodiments, the vertiport configuration module 320 has a finite set of predetermined configurations, and based on the input parameters, the vertiport configuration module 320 selects one configuration from the set of predetermined configurations. In some embodiments, the vertiport configuration module 320 may determine a configuration using a stochastic programming process such as a two stage stochastic optimization process. Because the configuration is determined using future information such as expected demand of passengers, future flight schedules, future energy requirements of the vehicles, there is underlying uncertainty in the prediction. In the two stage stochastic optimization process, some problems are solved in the first stage before the uncertainty is realized. For example, in the first stage, the vertiport configuration 320 module determines one configuration from the predetermined configuration using current information from the vehicles 110 the vertiport system 130, the future information, and user specified parameters. After the first stage, uncertainty in the solution is modeled based on the expected demand of passengers, future flight schedules, future energy requirements. Other problems are solved in the second stage after the uncertainty is realized using the solution from the first stage and the uncertainty. For example, the vertiport configuration module 320 determines how to match passengers to flights, flight legs of multi-leg flights, and battery recharging of vehicles in the second stage based in part on the uncertainty model.

In some embodiments, the vertiport configuration module 320 uses an artificial intelligence method such as reinforcement learning method to determine an optimal configuration from a set of predetermined set of configurations or to generate a new configuration for a time frame. The reinforcement learning method determines states of future time frames based on the current state and future probabilities. For example, a state of the vertiport during a given time frame represents the number of grounded vehicles, the number of FATO pads, and/or the number of parking pads at the beginning of a time frame on a vertiport. The uncertainty may be the total energy required for each of the grounded vehicles and the inbound vehicles. The vertiport configuration module 320 may determine configurations for the future that attempt to maximize cumulative reward (e.g., maximizing passenger throughput) across all periods given the current state and the scheduled inbound and outbound flights of the vertiport.

The vertiport configuration module 320 may be implemented using other machine learning methods and automatically generate new configurations with given input parameters. The machine learning methods may use Bayesian optimization, deep learning, and other algorithms.

The vertiport update module 330 updates a configuration of a vertiport based on a configuration selected by the vertiport configuration module 320. In some embodiments, the vertiport includes a ground surface with a lighting circuitry that includes lighting devices (e.g., LEDs) arranged to illuminate a pattern representing the configuration on the ground surface. For example, a FATO pad is represented by a first pattern and a parking pad is represented by a second pattern different from the first pattern. A taxiway may connect a FATO pad to at least one parking way, and the taxiway may be lit using a subset of the plurality of lighting devices. The vertiport update module 330 may provide instructions to the lighting circuitry that controls the plurality of lighting devices such that the configuration may be clearly visible to inbound vehicles.

In some embodiments, the ground surface may be built using a tessellation of a polygon (e.g., hexagon), such that a plurality of polygons may be lit dynamically to approximate a configuration. As discussed above, in some embodiments, vertiport configuration may be determined using machine learning methods, and tessellation may allow a greater number of configurations to be displayed. In some embodiments, the vertiport configuration module 320 may determine a configuration of the vertiport, and the vertiport update module 330 may determine a corresponding lighting pattern for the configuration. The vertiport configuration module 320 may determine which set of polygon units to light up on the vertiport to approximate the configuration. The accuracy of the configuration approximation increases with the number of polygons used in the tessellation.

The vehicle placement module 340 provides instructions to vehicles within a vertiport. The vehicle placement module 340 directs inbound vehicles to a specific FATO pad once the vertiport configuration module 320 updates the configuration of the vertiport. The vehicle placement module 340 also provides instructions to grounded vehicles. For example, the vehicle placement module 340 may be notified when a vehicle has completed charging to at least a threshold battery level. The vehicle placement module 340 may also receive status of the vehicle that indicates that the vehicle has passed other maintenance requirements and is cleared for the next flight. The vehicle placement module 340 may receive flight schedule and determine where to direct the vehicle. If the vehicle is not due for another flight for at least a threshold time, the vehicle placement module 340 may instruct the vehicle to remain on or move to a parking pad. If the vehicle is scheduled for a flight within the threshold time, the vehicle may be assigned to a FATO pad. In some embodiments, the configuration of the vertiport is updated such that the vehicle's parking pad is converted to a FATO pad and the vehicle does not have to move to a different location. In other embodiments, the vehicle is instructed when and where to go for the assigned FATO pad.

FIGS. 4A-4E are example configurations of a vertiport, in accordance with an embodiment. As discussed above with respect to FIG. 3, a ground surface 400 of a vertiport may include a lighting circuitry that includes lighting devices arranged to illuminate a pattern representing the configuration on the ground surface. The vertiport includes a plurality of parking pads 410, a plurality of FATO pads 420, and taxiways 430 that connect parking pads 410 and FATO pads 420. In other examples, there may be fewer or additional parking pads and FATO pads than what is shown in FIGS. 4A-4E.

Figure 4A:
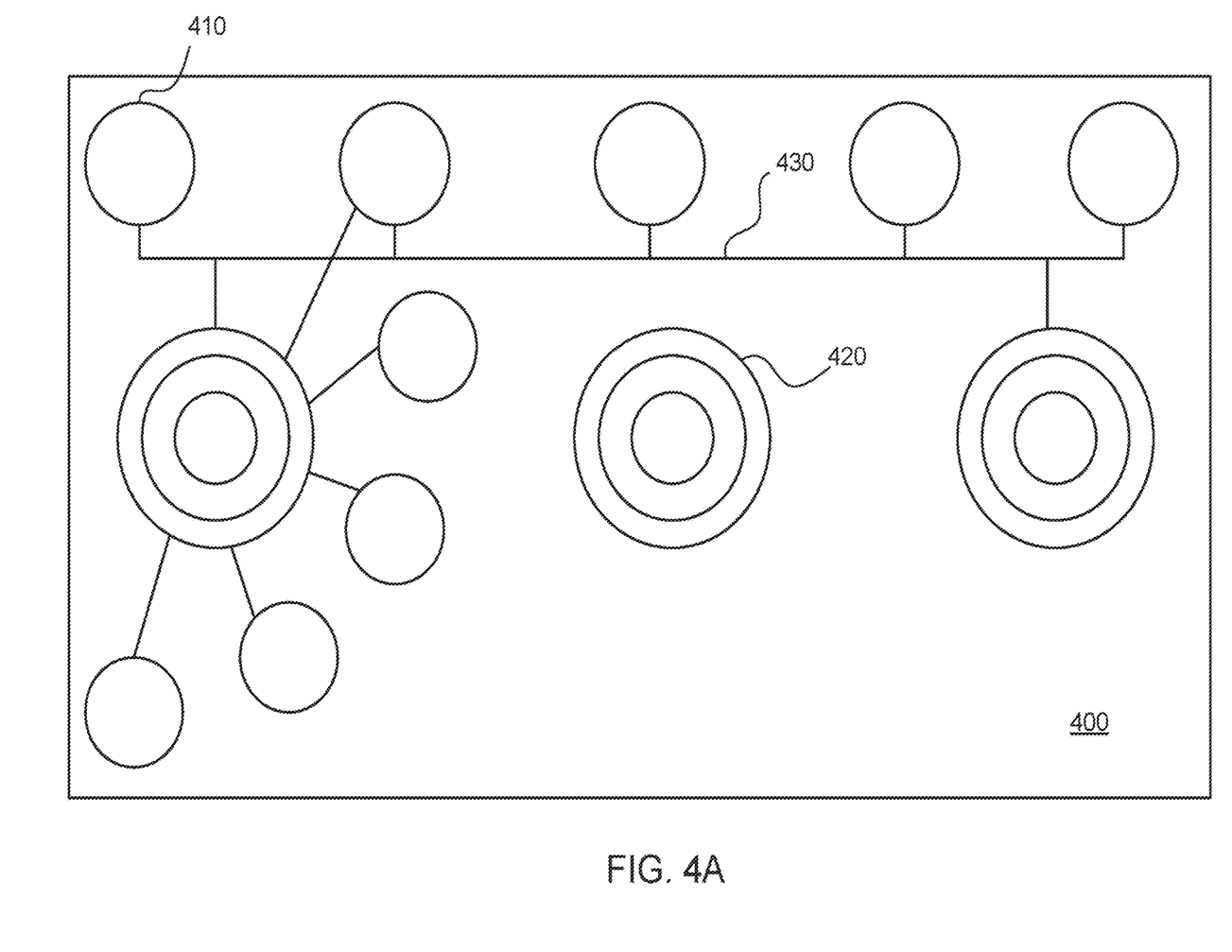
FIGS. 4A-4E are example configurations of a vertiport, in accordance with an embodiment.
Figure 4B:
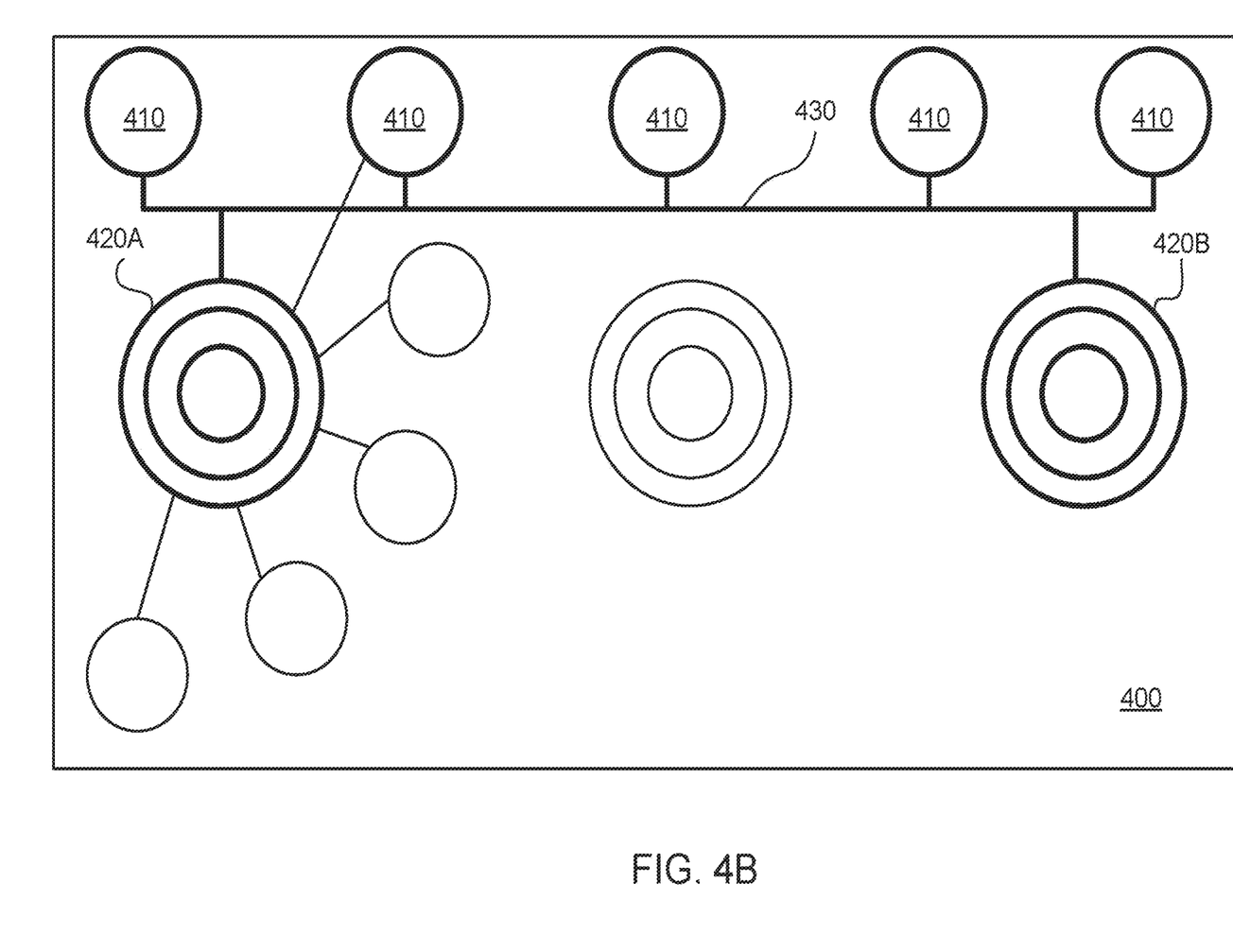
Figure 4C:
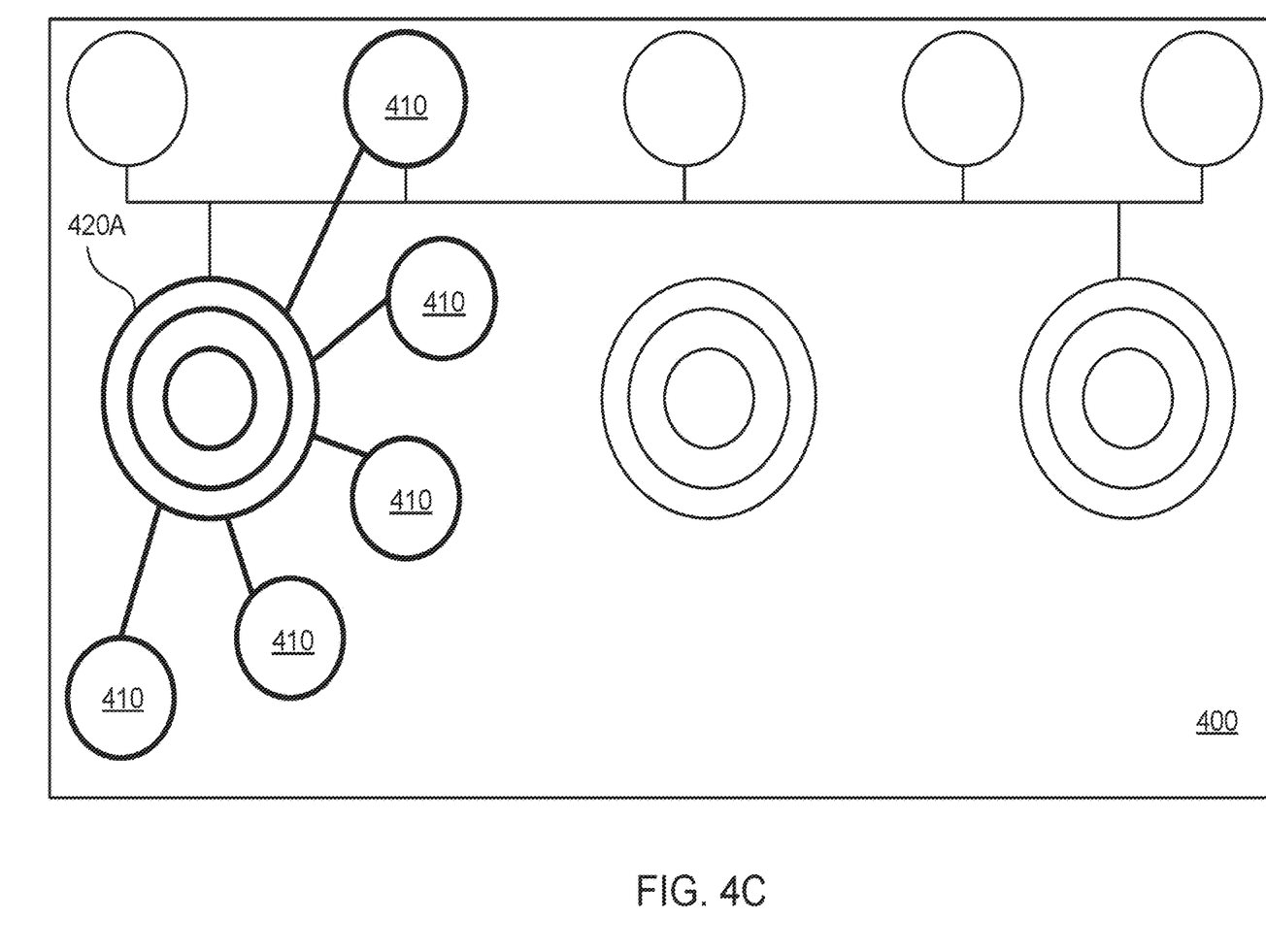
Figure 4D:
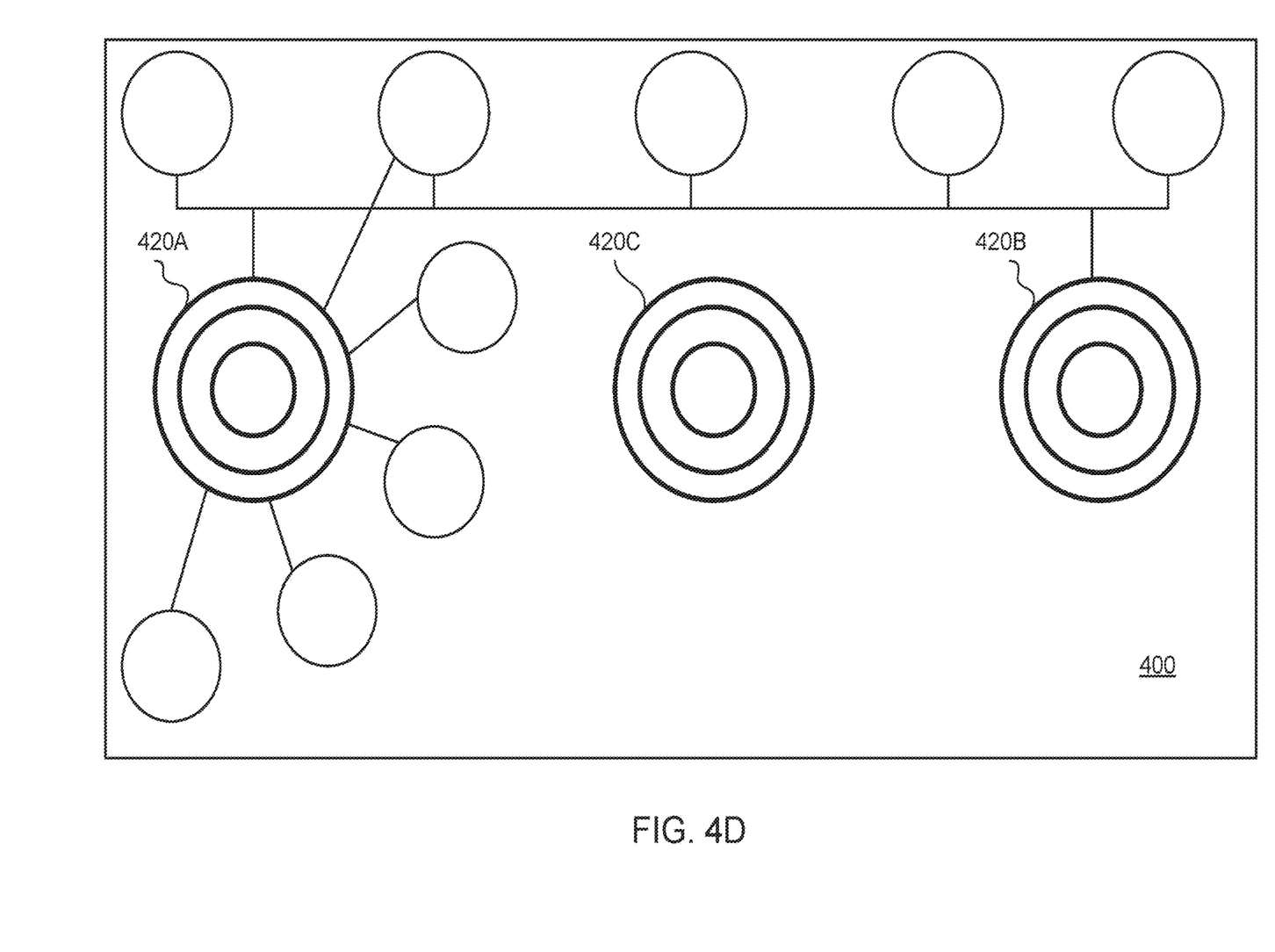

As shown in FIG. 4A, the vertiport may have a set of predetermined configurations that are superimposed on the ground surface 400 of the vertiport. FIG. 4A shows the different configurations of FIGS. 4B-4D superimposed on each other. By superimposing different configurations, the vertiport may reduce space usage and construction costs. During operation of the vertiports, the vertiport system selects the configuration for a time frame based on predicted usage and provides instructions to illuminate the pattern corresponding to the optimal configuration. In FIGS. 4B-4D, the illuminated pattern on the vertiport is represented by the bold lines.

FIG. 4B shows a linear configuration which includes a plurality of parking pads 410 and FATO pads 420A, 420B. In the linear configuration shown in FIG. 4B, there is a row of parking pads 410 adjacent to each other and two FATO pads 420A and 420B that are connected via taxiways 430. Each of the two FATO pads 420A and 420B are accessible from any of the plurality of parking pads 410. Each of the parking pads 410 are spaced at least a first threshold distance away from an adjacent parking pad 410 and at least a second threshold distance away from the FATO pads 420A and 420B. The requirements for distance between parking pads and/or FATO pads may be found in the aviation regulations store 220 of the transport network management system 140.

FIG. 4C shows a cloverleaf configuration which includes a plurality of parking pads 410 arranged around a FATO pad 420A. In the example shown in FIG. 4C, the plurality of parking pads 410 are equidistant from the FATO pad 420A. However, in other examples, parking pads 410 may be at different distances from the FATO pad 420A.

FIG. 4D shows an all FATO pad configuration including only FATO pads 420A, 420B, and 420C. The all FATO pad configuration may be used when there is a need for high throughput during a time frame. When there are many inbound and outbound vehicles, there is an increased need for FATO pads and a decreased need for parking pads.

Figure 4E:
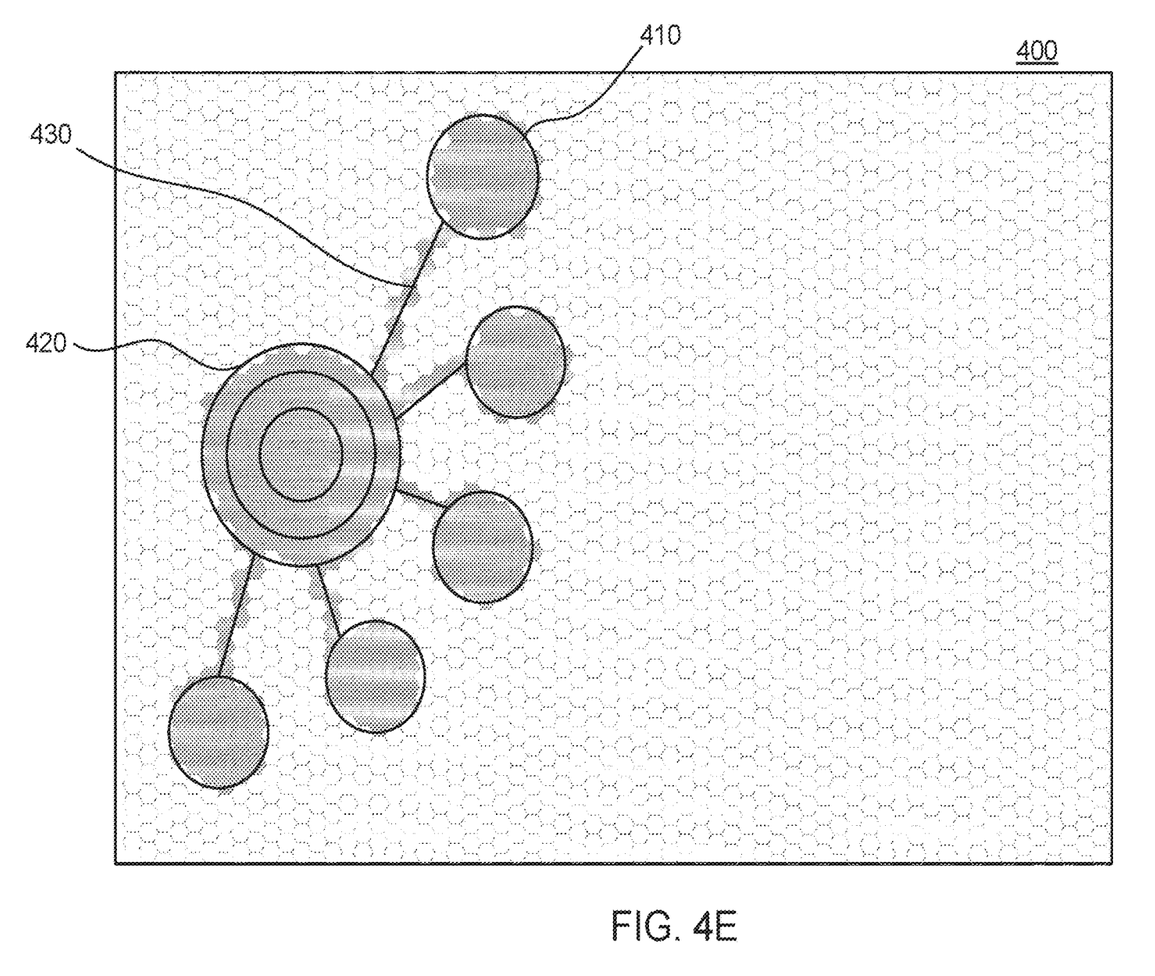

FIG. 4E illustrates an embodiment in which the ground surface 400 is built using a tessellation of hexagons. Although FIG. 4E shows the entire ground surface 400 as tessellated, in some embodiments, only a portion of the ground surface may be tessellated. Furthermore, other types of polygons may be used for the tessellation (e.g., triangles, rectangles, etc.). The tessellation of the ground surface 400 may allow a large number of lighting patterns to be implemented on the vertiport with a relatively simple construction. For example, vertiport configuration may be determined using machine learning methods, and the tessellation allows flexibility in displaying the vertiport configuration by lighting different combinations of the polygons to represent the configuration. After a configuration of the vertiport is determined, a corresponding lighting pattern that approximates the configuration using a set of polygons may be determined. The identified polygons are lit up to represent the configuration. FIG. 4E illustrates the cloverleaf configuration of FIG. 4C on the tessellation of hexagons. The hexagons corresponding to the parking pads 410, the FATO pad 420A, and the taxiways connecting the parking pads 410 and the FATO pad 420A may be lit up using light emitting devices. In some embodiments, each polygon may include light emitting devices of different colors, and based on location of the polygon, the color of the polygon may be determined. For example, the parking pads 410 may be represented by a first color (e.g., green) while the FATO pads 420 are represented by a second color that is different from the first color (e.g., yellow) such that vehicles on the vertiport may easily distinguish a FATO pad 420 from a parking pad 410. The accuracy of the configuration approximation increases when a larger number of polygons are used in the tessellation.

FIGS. 5A-5D illustrate updating a vertiport configuration, in accordance with an embodiment. In the example shown in FIGS. 5A-5D, a same location on the vertiport may be used for FATO pads and parking pads. After a vehicle lands onto a FATO pad on the vertiport, the vertiport may change the configuration such that the FATO pad is changed to a parking pad while making a previous parking spot elsewhere on the vertiport a FATO pad. The vehicle that landed onto the FATO pad may remain in the same location for charging without having to taxi to a parking pad because the FATO pad is switched to a parking pad.

Figure 5A:
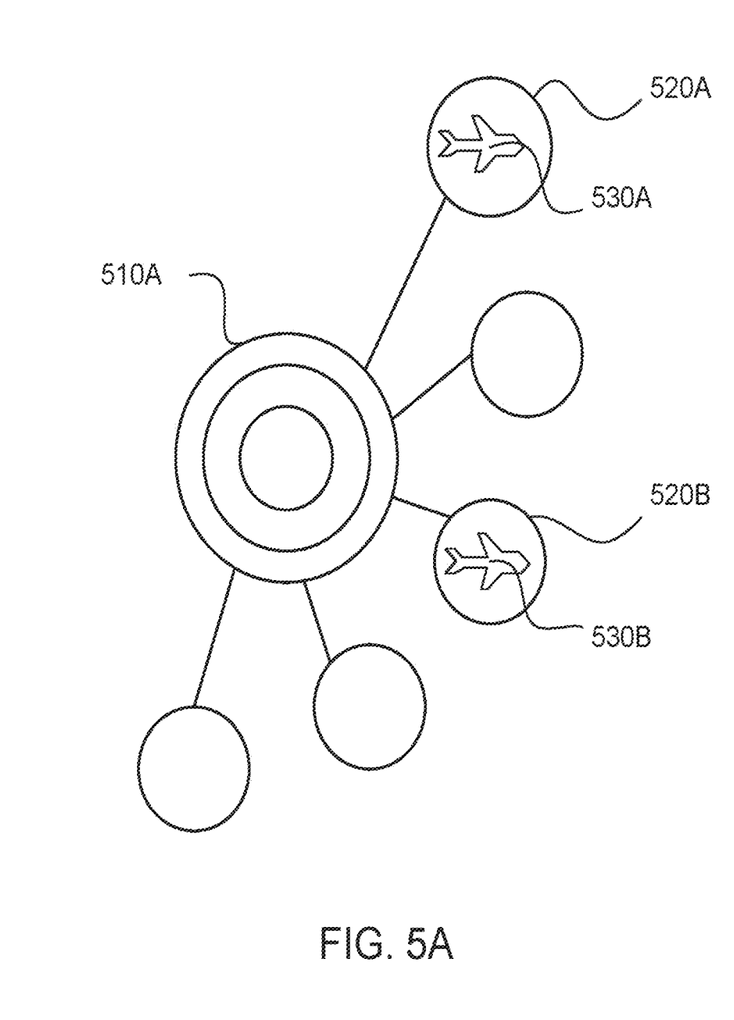
FIGS. 5A-5D illustrate updating a vertiport configuration, in accordance with an embodiment.

In FIG. 5A, the vertiport has a cloverleaf configuration with a first vehicle 530A parked on a first parking pad 520A and a second vehicle 530B parked on a second parking pad 530B. The first parking pad 520A and the second parking pad 520B are connected to a FATO pad 510A. The batteries of the first vehicle 530A and the second vehicle 530B are being charged at the respective parking pads in preparation for the next flight. In some embodiments, the first vehicle 530A and the second vehicle 530B are charged until the batteries are charged to the maximum capacities of the batteries. In some embodiments, the level to which a battery is charged is determined based on the distance to the destination locations of the vehicles, and the batteries are charged to a threshold that is lower than the maximum capacities of the batteries.

Figure 5B:
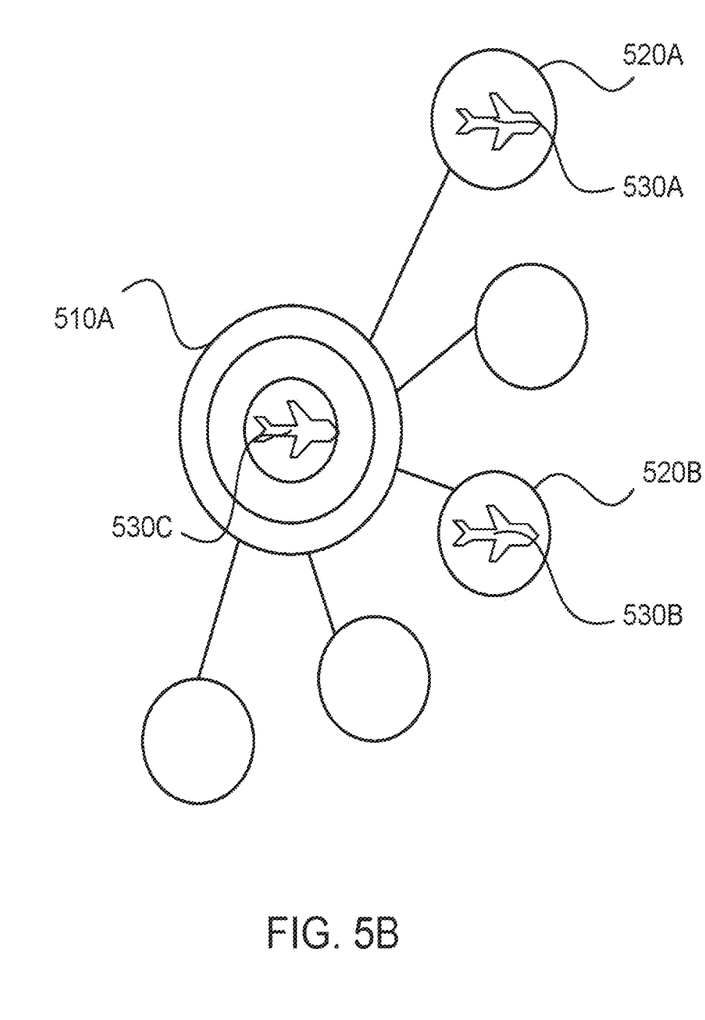

In FIG. 5B, a third vehicle 530C lands onto the FATO pad 510A while the first vehicle 530A and the second vehicle 530B are being charged at the vertiport. The third vehicle 530C has a low battery level and needs to be charged for its next scheduled flight.

Figure 5C:
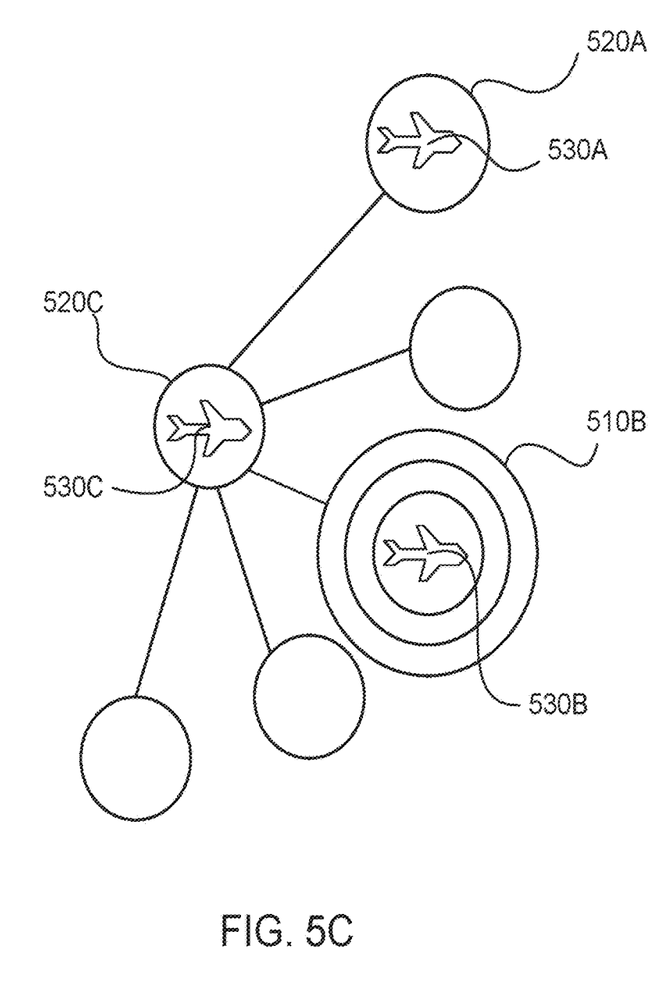
Figure 5D:
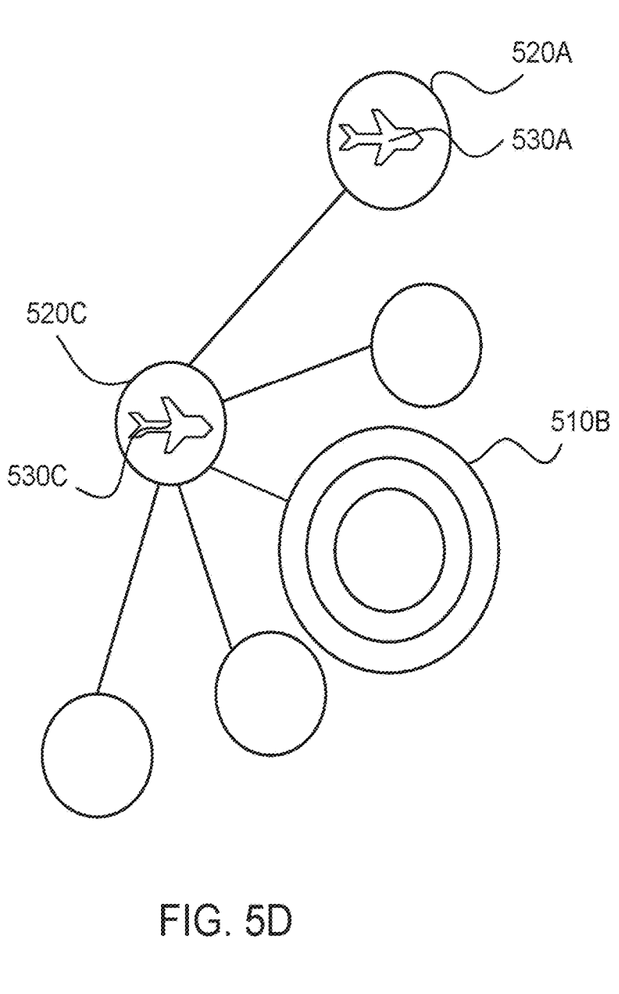

In FIG. 5C, the second vehicle 530B is charged to at least a threshold value, and the second vehicle 530B is scheduled for a flight. For the second vehicle 530B to takeoff from the vertiport, the second vehicle 530B should be on a FATO pad. The vertiport system 130 may update the vertiport configuration such that the second vehicle 530B may takeoff directly from its current location. The vertiport system 130 switches the parking pad 520B into a second FATO pad 510B while simultaneously switching the FATO pad 510A into a parking pad 520C. The vertiport system 130 may execute the switch simultaneously because of aviation regulations from the aviation regulations store 220. For example, there may be a regulation that outlines a minimum required distance between two FATO pads. If the first FATO pad 510A were to remain a FATO pad while the parking pad 520B is switched into the second FATO pad 510B, there may be two FATO pads within the minimum required distance of each other, which violates the regulation. After the third vehicle 530B is cleared for takeoff, the third vehicle 530B departs the vertiport from the second FATO pad at its scheduled departure time as shown in FIG.

Figure 6:
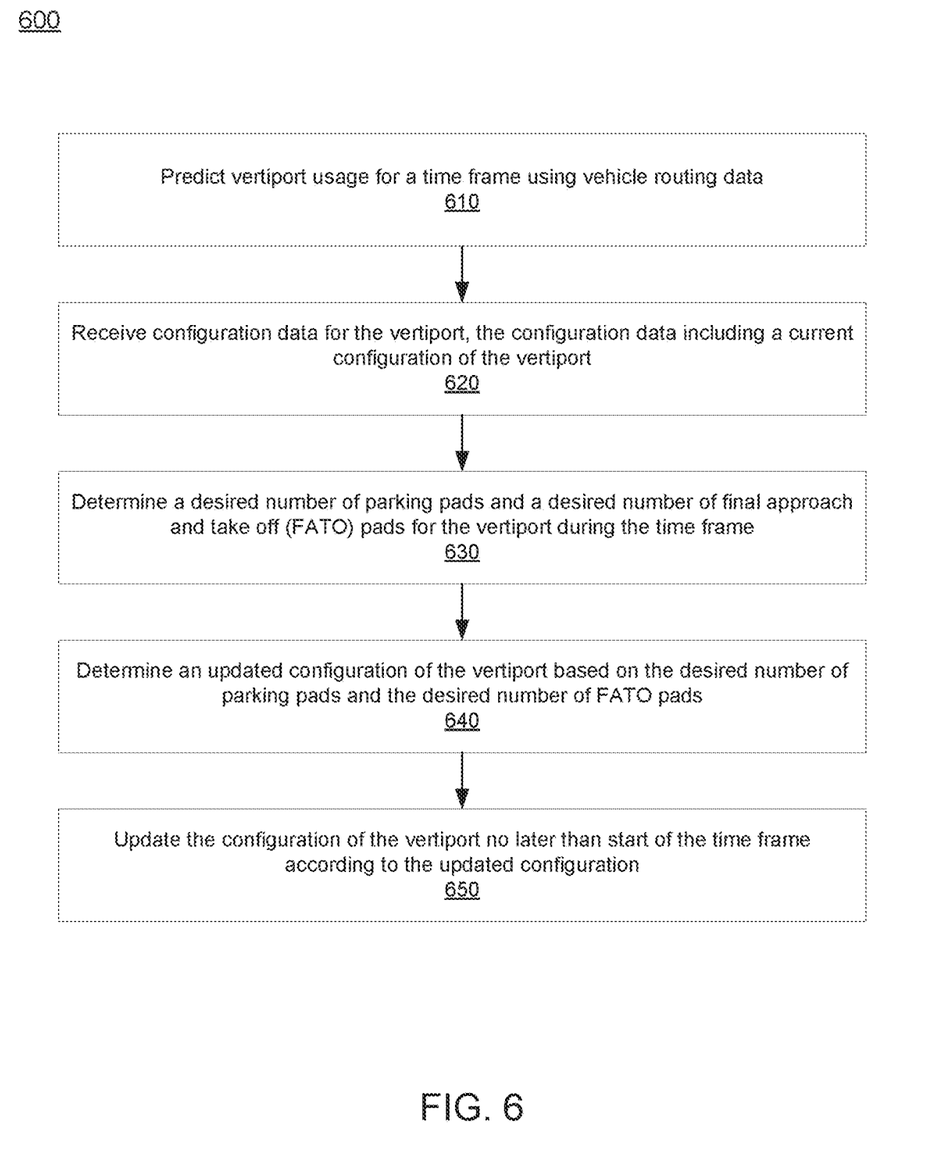
FIG. 6 is a flowchart illustrating a process of updating a vertiport configuration, in accordance with an embodiment.

FIG. 6 is a flowchart illustrating a process of updating a vertiport configuration, in accordance with an embodiment. A system predicts 610 vertiport usage for a time frame using vehicle routing data. The vehicle routing data includes information such as flight schedules of grounded vehicles and inbound vehicles of the vertiport. The system may also receive status information from vehicles such as current location, scheduled flight route, and current battery charge.

The system receives 620 configuration data for the vertiport, the configuration data including a current configuration of the vertiport. The current configuration of the vertiport may include a number and location of FATO pads and parking pads. The current configuration of the vertiport may also describe the location of the grounded vehicles on the vertiport.

The system determines 630 a desired number of parking pads and a desired number of FATO pads for the vertiport during the time frame. The desired number of parking pads and the desired number of FATO pads are determined based on flight data and prediction of passenger demand. As described above with reference to the vertiport usage prediction module 310 of FIG. 3, the system may determine a total number of vehicles expected to be at the vertiport during the time frame based on flight data and predicted passenger demand. From this, the system may determine a desired number of FATO pads and parking pads to service the requirements of expected vehicles during the time frame.

The system determines 640 an updated configuration of the vertiport based on the desired number of parking pads and the desired number of FATO pads. The system may determine the configuration of the FATO pads and the parking pads using machine learning algorithms. The system may select a configuration from a set of predetermined configurations or may generate a new configuration, depending on the specific embodiment. As described above with reference to the vertiport configuration module 320 of FIG. 3, the system may determine a configuration that efficiently provides the desired number of FATO pads and parking pads based on input parameters including the current configuration of a vertiport, schedule of flights, energy costs, aviation regulations, and status of vehicles.

The system updates 650 the configuration of the vertiport no later than start of the time frame according to the updated configuration. For example, in one embodiment, as described previously, the system uses light installed in the floor of the vertiport to illuminate a pattern indicating the updated configuration.

Figure 7:
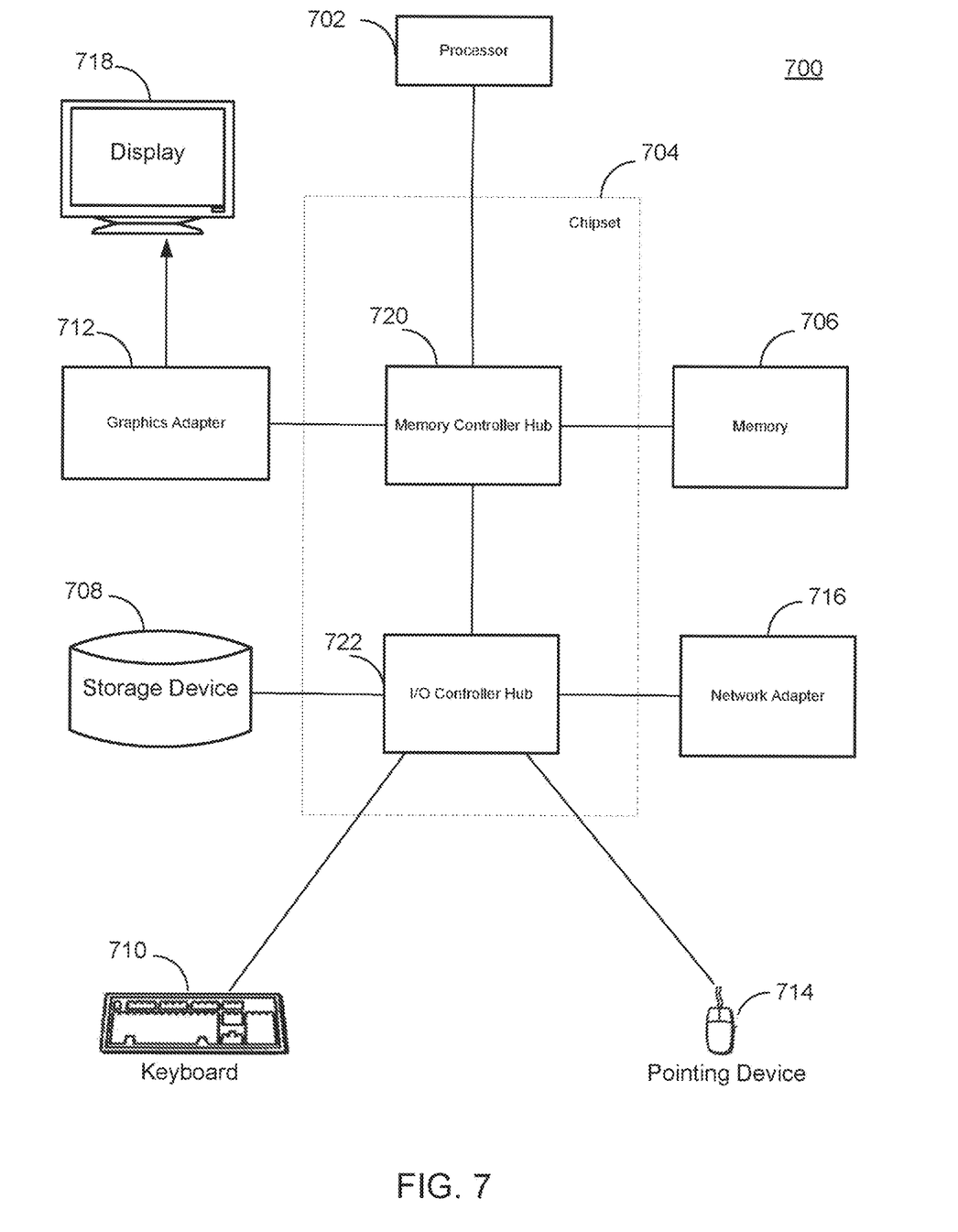
FIG. 7 is a block diagram that illustrates a computing environment for a vertiport system, in accordance with an embodiment.

FIG. 7 is a block diagram that illustrates a computing environment for a vertiport system, in accordance with an embodiment. The computer system 700 may be used to perform the processes described above with reference to FIG. 6. Illustrated in FIG. 7 are at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display device 718 is coupled to the graphics adapter 712. A storage device 708, keyboard 710, pointing device 714, and network adapter 716 are coupled to the I/O controller hub 722. Other embodiments of the computer 700 have different architectures. For example, the memory 706 is directly coupled to the processor 702 in some embodiments.

The storage device 708 includes one or more non-transitory computer-readable storage media such as a hard drive, compact disk read-only memory (CD-ROM), DVD, or a solid-state memory device. The memory 706 holds instructions and data used by the processor 702. For example, the memory 706 may store instructions that when executed by the processor 702, configures the processor to perform the method 600. The pointing device 714 is used in combination with the keyboard 710 to input data into the computer system 700. The graphics adapter 712 displays images and other information on the display device 718. In some embodiments, the display device 718 includes a touch screen capability for receiving user input and selections. The network adapter 716 couples the computer 700 to a network that controls, for example, the vertiport system 130. The computer 700 may be used for receiving information such as length of a time frame of a vertiport configuration, a daily maximum energy limit, or a cost associated with changing the vertiport configuration from a user. The computer 700 may also be used to control the lighting circuitry used to illuminate a selected configuration on the vertiport. Some embodiments of the computer 700 have different and/or other components than those shown in FIG. 7.

The computer 700 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 708, loaded into the memory 706, and executed by the processor 702. For example, program instructions for the method describe herein can be stored on the storage device 708, loaded into the memory 706, and executed by the processor 702.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
computing vertiport configuration data indicative of a number of parking pads and a number of final approach and takeoff (FATO) pads for a vertiport, wherein the vertiport is associated with a plurality of lighting devices disposed relative to a ground surface of the vertiport, wherein at least one FATO pad of the number of FATO pads is associated with a first lighting pattern and at least one parking pad of the number of parking pads is associated with a second lighting pattern that is different than the first lighting pattern; and
providing instructions for illuminating the number of parking pads and the number of FATO pads indicated by the vertiport configuration data, wherein the plurality of lighting devices illuminate one or more of the plurality of lighting devices to form the first lighting pattern and the second lighting pattern.

2. The computer-implemented method of claim 1, wherein the plurality of lighting devices comprise a tessellation of shapes provided on one or more portions of the ground surface.

3. The computer-implemented method of claim 2, wherein each shape in the tessellation of shapes comprises a plurality of light emitting devices respectively corresponding to a plurality of different colors.

4. The computer-implemented method of claim 3, wherein providing instructions for illuminating the number of parking pads and the number of FATO pads indicated by the vertiport configuration data comprises:
providing instructions for illuminating a first set of shapes in the tessellation of shapes corresponding to the number of parking pads using a first color of the plurality of different colors;
providing instructions for illuminating a second set of shapes in the tessellation of shapes corresponding to the number of FATO pads using a second color of the plurality of different colors.

5. The computer-implemented method of claim 2, wherein the tessellation of shapes comprises a tessellation of polygons.

6. The computer-implemented method of claim 5, wherein the tessellation of polygons comprises a tessellation of triangles, rectangles, or hexagons.

7. The computer-implemented method of claim 5, the method further comprising computing a set of polygons in the tessellation of polygons to be illuminated for representing a configuration corresponding to the first lighting pattern and the second lighting pattern.

8. The computer-implemented method of claim 1, wherein:
the vertiport configuration data further comprises a third lighting pattern associated with a taxiway between at least one FATO pad of the number of FATO pads and at least one parking pad of the number of parking pads; and
the method further comprises providing instructions for illuminating a portion of the plurality of lighting devices to form the third lighting pattern.

9. The computer-implemented method of claim 1, wherein the vertiport is associated with a set of predetermined configurations, the set of predetermined configurations respectively comprising a particular number of FATO pads and a particular number of parking pads.

10. The computer-implemented method of claim 1, further comprising computing a comparison of the vertiport configuration data to a particular regulation associated with spacing of the number of FATO pads or the number of parking pads; and
wherein providing instructions for illuminating the number of parking pads and the number of FATO pads is responsive to the vertiport configuration data being in compliance with the particular regulation.

11. The computer-implemented method of claim 10, wherein the particular regulation comprises at least one spacing rule associated with the number of FATO pads or the number of parking pads.

12. A system comprising:
one or more processors; and
a non-transitory computer-readable medium comprising computer program instructions that when executed by the one or more processors causes the system to perform operations comprising:
computing vertiport configuration data indicative of a number of parking pads and a number of final approach and takeoff (FATO) pads for a vertiport, wherein the vertiport is associated with a plurality of lighting devices disposed relative to a ground surface of the vertiport, wherein at least one FATO pad of the number of FATO pads is associated with a first lighting pattern and at least one parking pad of the number of parking pads is associated with a second lighting pattern that is different than the first lighting pattern; and
providing instructions for illuminating the number of parking pads and the number of FATO pads indicated by the vertiport configuration data, wherein the plurality of lighting devices illuminate one or more of the plurality of lighting devices to form the first lighting pattern and the second lighting pattern.

13. The system of claim 12, wherein the plurality of lighting devices comprise a tessellation of shapes provided on one or more portions of the ground surface.

14. The system of claim 13, wherein each shape in the tessellation of shapes comprises a plurality of light emitting devices respectively corresponding to a plurality of different colors.

15. The system of claim 14, wherein providing instructions for illuminating the number of parking pads and the number of FATO pads indicated by the vertiport configuration data comprises:
providing instructions for illuminating a first set of shapes in the tessellation of shapes corresponding to the number of parking pads using a first color of the plurality of different colors;
providing instructions for illuminating a second set of shapes in the tessellation of shapes corresponding to the number of FATO pads using a second color of the plurality of different colors.

16. The system of claim 13, wherein the tessellation of shapes comprises a tessellation of polygons.

17. The system of claim 16, wherein the tessellation of polygons comprises a tessellation of triangles, rectangles, or hexagons.

18. The system of claim 16, the operations further comprising computing a set of polygons in the tessellation of polygons to be illuminated for representing a configuration corresponding to the first lighting pattern and the second lighting pattern.

19. One or more non-transitory computer-readable media that store instructions for execution by one or more processors that cause the one or more processors to perform operations, the operations comprising:
  computing vertiport configuration data indicative of a number of parking pads and a number of final approach and takeoff (FATO) pads for a vertiport, wherein the vertiport is associated with a plurality of lighting devices disposed relative to a ground surface of the vertiport, wherein at least one FATO pad of the number of FATO pads is associated with a first lighting pattern and at least one parking pad of the number of parking pads is associated with a second lighting pattern that is different than the first lighting pattern; and
  providing instructions for illuminating the number of parking pads and the number of FATO pads indicated by the vertiport configuration data, wherein the plurality of lighting devices illuminate one or more of the plurality of lighting devices to form the first lighting pattern and the second lighting pattern.

20. The one or more non-transitory computer-readable media of claim 19, wherein the plurality of lighting devices comprise a tessellation of shapes provided on one or more portions of the ground surface.

* * * * *